US007490764B2

(12) United States Patent
Clark

(10) Patent No.: US 7,490,764 B2
(45) Date of Patent: Feb. 17, 2009

(54) SECURE ENCLOSURE FOR SUB-ASSEMBLY OF SELF SERVICE EQUIPMENT

(75) Inventor: Barrie Clark, Dundee (GB)

(73) Assignee: NCR Corporation, Dayton, OH (US)

( * ) Notice: Subject to any disclaimer, the term of this patent is extended or adjusted under 35 U.S.C. 154(b) by 432 days.

(21) Appl. No.: 11/305,538

(22) Filed: Dec. 16, 2005

(65) Prior Publication Data

US 2007/0138250 A1 Jun. 21, 2007

(51) Int. Cl.
*G06K 15/00* (2006.01)

(52) U.S. Cl. ........................ 235/383; 235/379; 235/381

(58) Field of Classification Search ................. 235/383, 235/379, 381

See application file for complete search history.

(56) References Cited

U.S. PATENT DOCUMENTS

| | | | | |
|---|---|---|---|---|
| 7,116,226 | B1 * | 10/2006 | Pollard | 340/570 |
| 2004/0149819 | A1 * | 8/2004 | Shepley et al. | 235/379 |
| 2004/0178258 | A1 | 9/2004 | Scarafile et al. | |
| 2005/0103852 | A1 * | 5/2005 | Lucera et al. | 235/462.14 |
| 2005/0279822 | A1 * | 12/2005 | Douglass et al. | 235/379 |

FOREIGN PATENT DOCUMENTS

| | | | |
|---|---|---|---|
| DE | 101 02 283 | A1 | 9/2001 |

* cited by examiner

*Primary Examiner*—Ahshik Kim
(74) *Attorney, Agent, or Firm*—Michael Chan

(57) ABSTRACT

Housings are typically used to protect sub-assemblies in self-service equipment such as key-pad assemblies in automated teller machines (ATMs), self-service kiosks, pay-as-you-go photocopiers and the like. There is a need to secure those housings to prevent access to and tampering of the equipment within. In addition, when replacement sub-assemblies are used, for example, for maintenance or upgrade, then it is necessary to authenticate those sub-assemblies. By providing markers fixed in sub-assembly housings and sensors in the housings or self-service equipment, it is possible to overcome these problems. The markers and sensors are brought into alignment when the sub-assembly housing is fully assembled. The markers and sensors are arranged to detect when a particular physical relationship between the markers and sensors is lost or altered. For example, the markers provide spectral signatures and comprise rare earth metals such as lanthanides.

6 Claims, 3 Drawing Sheets

SECURE ENCLOSURE FOR SUB-ASSEMBLY OF SELF SERVICE EQUIPMENT

The present invention relates to self-service equipment. It is particularly related to, but in no way limited to secure enclosures for sub-assemblies of self-service equipment.

BACKGROUND

Self-service equipment such as automated teller machines (ATMs), self-service kiosks, photocopiers, vending machines, self-service internet terminals, self-service fax machines and the like are sometimes vulnerable to unauthorized access or tampering. If security has been breached in this way it is important to detect the situation as soon as possible and to shut down the equipment in order to limit any damage or loss.

Previous approaches to dealing with this issue have involved using housings for the self-service equipment or sub-assemblies of that equipment. If unauthorized access to the housing occurs typically there is damage to the housing or the housing is replaced incorrectly or with dissimilar material. These changes are then detected visibly by users of the equipment, field operators and the like. This approach provides a good first line of defense but it relies upon users and field operatives to make their own judgments and take quick action which is not always possible. Also, if a housing is breached and replaced using a matching housing the situation is very difficult to detect by the uneducated human eye.

Another approach has been to use electronic circuits associated with such housings so that those circuits are broken in the event of unauthorized access. However, this approach is relatively complex.

A particular problem relating to self-service equipment is the need to replace sub-assemblies within the equipment in the event of break down of sub-assemblies, upgrade of those sub-assemblies or for other reasons. In that case there is a need to authenticate the replacement sub-assemblies to ensure that security has not been breached and to ensure that correct sub-assembly equipment is being used. At present manual methods are used to provide such authentication and these methods are time consuming and difficult to keep secure.

An object of the present invention is therefore to provide a secure enclosure for protection of one or more sub-assemblies in a self-service apparatus which overcomes or at least mitigates one or more of the problems mentioned above.

SUMMARY

Housings are typically used to protect sub-assemblies in self-service equipment such as key-pad assemblies in automated teller machines (ATMs), self-service kiosks, pay-as-you-go photocopiers and the like. There is a need to secure those housings to prevent access to and tampering of the equipment within. In addition, when replacement sub-assemblies are used, for example, for maintenance or upgrade, then it is necessary to authenticate those sub-assemblies. By providing markers fixed in sub-assembly housings and sensors in the housings or self-service equipment, it is possible to overcome these problems. The markers and sensors are brought into alignment when the sub-assembly housing is fully assembled. The markers and sensors are arranged to detect when a particular physical relationship between the markers and sensors is lost or altered. For example, the markers provide spectral signatures and comprise rare earth metals such as lanthanides.

According to an aspect of the invention there is provided a secure enclosure for protection of at least one sub-assembly in a self-service apparatus, said secure enclosure comprising:

a housing arranged to contain the sub-assembly;

one or more markers fixed in said housing;

one or more sensors, each sensor being arranged to detect a particular physical relationship between one or more of the markers and itself;

a trigger arranged to automatically activate if any of the particular physical relationships between the sensors and markers is lost.

This provides the advantage that not only is it possible to detect tampering of the sub-assembly but it is also possible to authenticate the sub-assembly in a simple, reliable, secure and cost effective manner. If the trigger is activated this indicates that the sub-assembly has either been tampered with or is not the authentic sub-assembly. It is not necessary to rely on users or field engineers to detect tampering or train and use operatives to carry out authentication (for example, if sub-assemblies are replaced for maintenance). This improves security and reduces costs.

Preferably the markers each have an associated spectral signature.

For example the markers are fluorescent. This can be achieved by using one or more lanthanides; for example, in microscopic carrier beads.

The sensors each comprise one or more light sources. Light from the sensors incident on the markers produces fluorescence with a particular spectral profile as described in more detail below.

The invention also encompasses a sub-assembly of a self-service apparatus, the sub-assembly being housed in a secure enclosure as described above.

The invention also encompasses a self-service apparatus comprising a sub-assembly as described above.

According to another aspect of the invention there is provided a method of protecting or authenticating at least one sub-assembly in a self-service apparatus, said method comprising:

providing a housing arranged to contain the sub-assembly;

providing one or more markers fixed in said housing;

providing one or more sensors, each sensor being arranged to detect a particular physical relationship between one or more of the markers and itself;

automatically activating a trigger if any of the particular physical relationships between the sensors and markers is lost.

Preferably the method further comprises shutting down the self-service apparatus if the trigger is activated.

Advantageously, the method comprises fixing the particular physical relationship between the markers and sensors in a controlled environment prior to use of the sub-assembly in a self-service apparatus in the field.

Preferably the step of providing the markers comprises applying paint incorporating the markers to the housing.

Preferably the sensors are arranged to detect the particular physical relationship by means of monitoring spectal profiles of the markers.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

DETAILED DESCRIPTION

Embodiments of the present invention are described below by way of example only. These examples represent the best ways of putting the invention into practice that are currently known to the Applicant although they are not the only ways in which this could be achieved.

Figure 1:
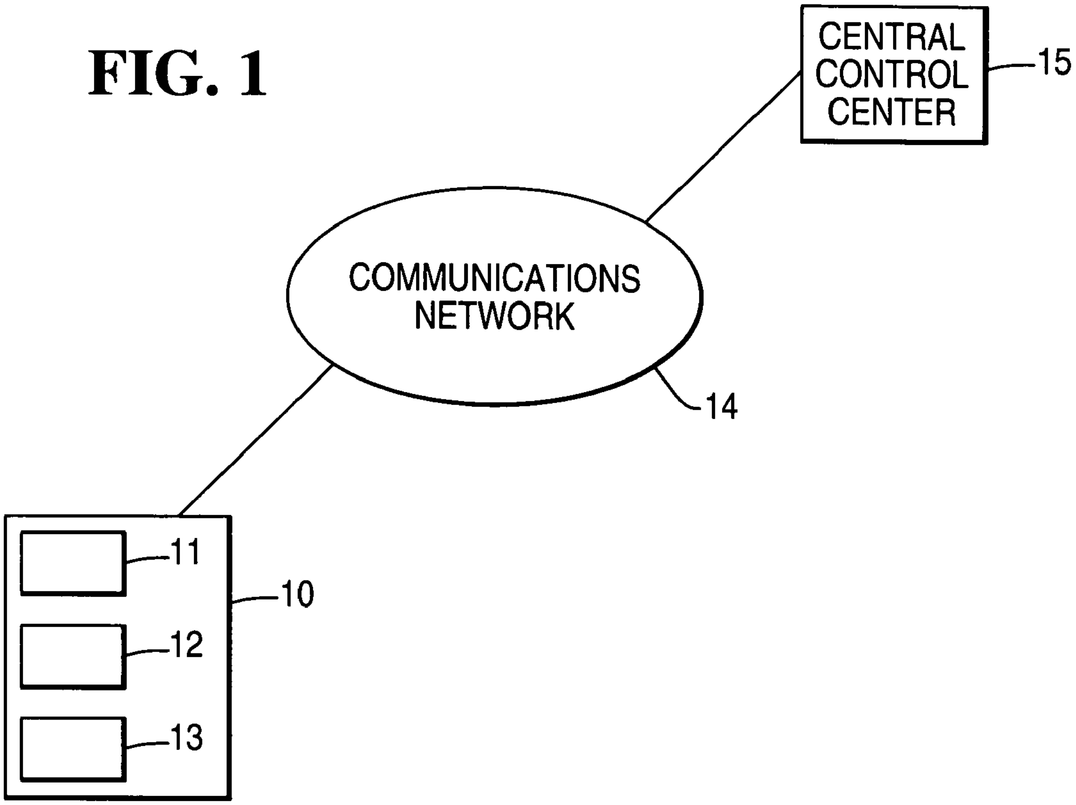
FIG. 1 is a schematic diagram of a self-service apparatus.

FIG. 1 is a schematic diagram of a self-service apparatus 10 comprising sub-assemblies 11, 12, 13. The self-service apparatus 10 is shown as connected to a communications network 14 which comprises a central control center 15. However, it is not essential for the self-service apparatus to be connected in this way; it may also be stand-alone. The self-service apparatus is of any suitable type such as an automated teller machine (ATM), self-service kiosk, pay-as-you-go device (e.g. photocopier, fax, internet terminal, media player) photo booth or other self-service apparatus.

FIG. 1 illustrates three sub-assemblies 11, 12, 13 incorporated in the self-service apparatus 10. These sub-assemblies are of any suitable type and are functional units which may or may not be removably inserted in the self-service apparatus. That is, the sub-assemblies can be of the type where they are easily taken out of and replaced into the self-service apparatus in a "plug and play" type manner. Examples of sub-assemblies comprise key-pad assemblies, cash dispenser pick units, media cassettes, ink cartridges, goods dispensing units; smart card reading units, key-pad assemblies, cash dispensers, encryption assemblies, note recognition assemblies, printer consumables and biometric modules.

Figure 2:
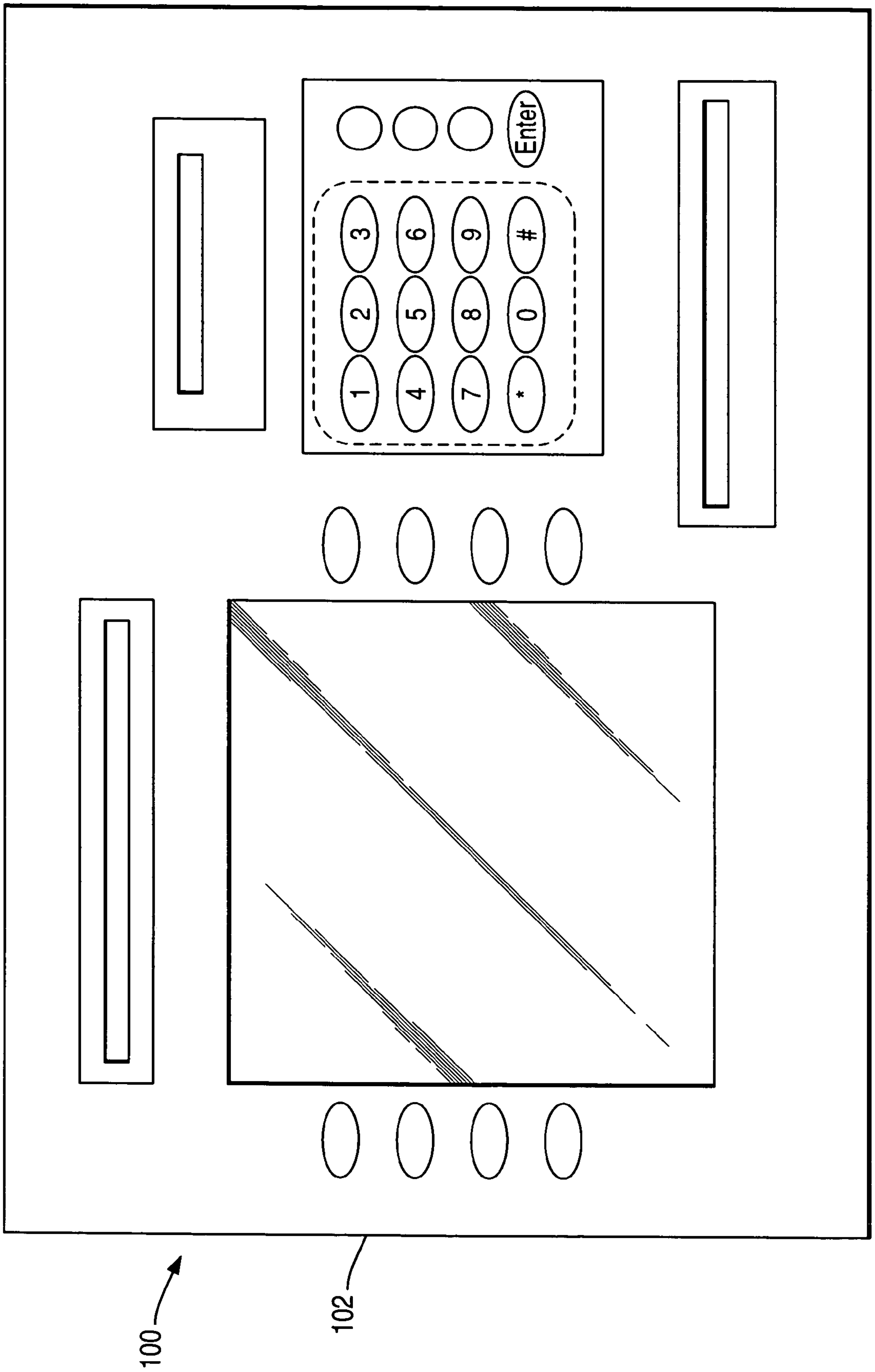
FIG. 2 is a schematic diagram of a key-pad assembly of an ATM encased in a housing.

FIG. 2 is a schematic plan view of a key-pad assembly 100 of an ATM encased in a housing 102. Within the housing are layers of electronic circuits and other equipment beneath the key-pad itself as known in the art. The housing 102 incorporates one or more markers (not shown) on its inner surfaces or integral with those surfaces. Sensors (not shown) are also provided attached to the contents of the housing 102.

For example, in the case of a secure enclosure, sensors are located within the sub-assembly being protected by the enclosure. This eliminates the need for sensors external (and therefore vulnerable to attack) to the sub-assembly electronics. In the case of a field-replaceable part, it is possible (although not essential) that a sensor is placed in the replacement part itself.

Figure 3:
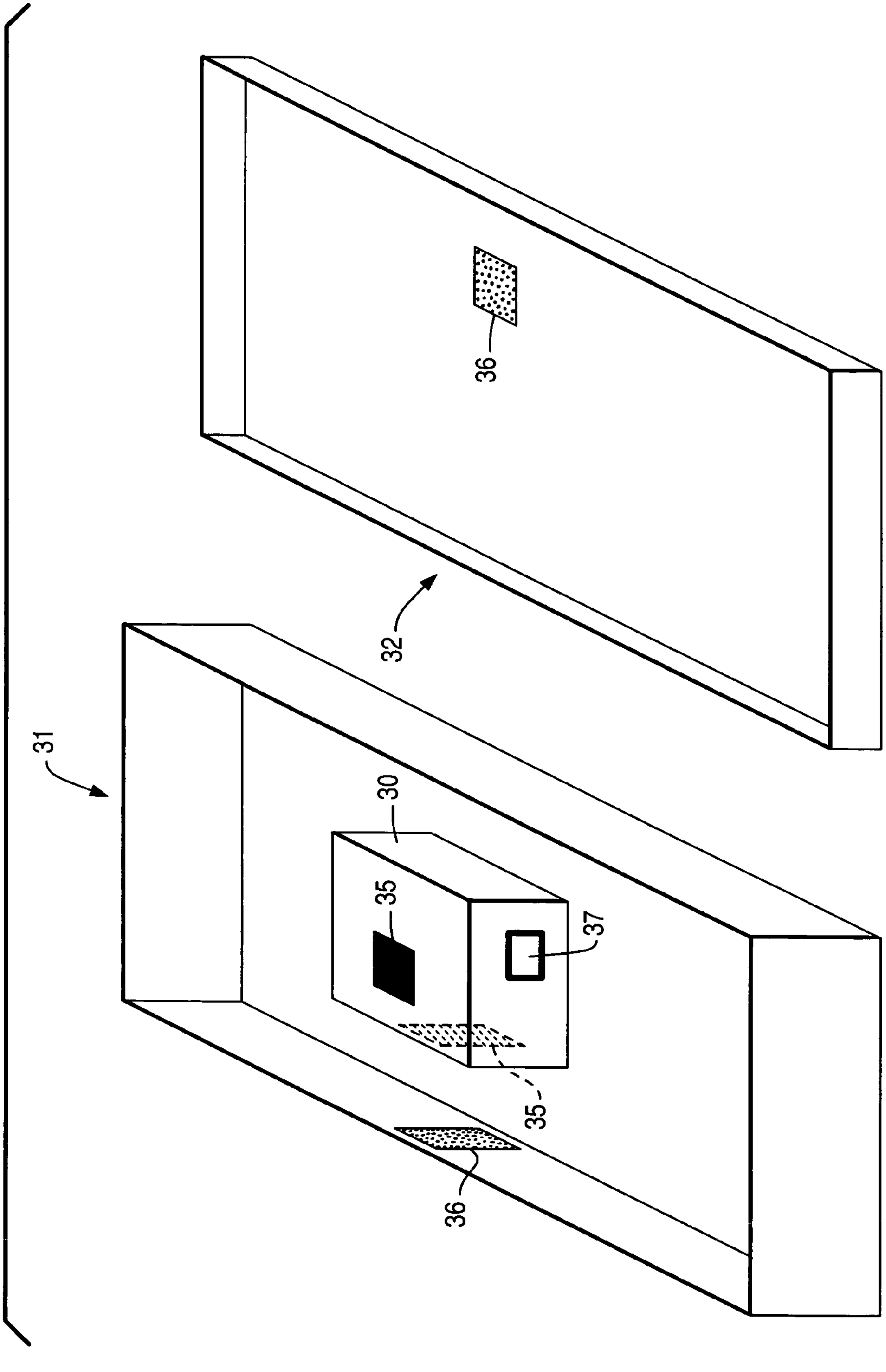
FIG. 3 is a schematic diagram of a sub-assembly of a self-service apparatus in a housing having a lid which is removed.

FIG. 3 is a schematic diagram of a sub-assembly 30 of a self-service apparatus in a housing 31 having a lid 32 which is removed. The sub-assembly 30 comprises sensors 35 fixed to the sub-assembly itself. The sub-assembly 30 is fixed into the housing base 31 although this is not essential.

The housing base 31 and/or lid 32 also comprise one or more markers 36. For example, these are printed onto the base 31 and lid 32 in regions arranged to align or be substantially opposite the sensors 35 when the housing and sub-assembly are assembled in use.

Prior to use the sub-assembly is installed in the housing and the markers and sensors calibrated or "set" by authorized personnel such as during manufacturing or at a controlled premises. That is, the sensors are arranged to detect a particular physical relationship between themselves and the markers and to "recognize" particular unique characteristics of the markers. If these relationships or characteristics change or are lost the sensors activate a trigger 37. Thus if the sub-assembly is moved with respect to the housing (or vice versa) the sensors detect this fact. Also, if the sub-assembly is replaced with an unauthorized sub-assembly this fact is detected. In this way it is possible to authenticate sub-assemblies and detect tampering or unauthorized access to the housing.

The trigger 37 comprises electronic components or other suitable means for shutting down the self-service apparatus, sending an alarm signal to the central control center 15, and/or taking any other suitable damage limitation and security promoting actions.

The markers can be of any suitable type. In a preferred example, the markers are arranged to provide a spectral profile, for example, by being fluorescent. They are preferably microscopic or of smaller scale (for example, using nanotechnology).

In a particularly preferred example, the markers comprise rare earth metals, such as lanthanides supported in a suitable medium such as microscopic glass beads. Those glass beads can be incorporated into paint and applied to parts of the housing and/or sub-assembly. Alternatively the glass beads can be incorporated into plastics or other material used to form the housing or sub-assembly. Full details about example suitable markers are provided in European Patent Application EP 1491350. That document describes optically detectable security markers for emitting light at pre-selected wavelengths. The markers comprise a rare-earth dopant and a carrier incorporating the rare earth dopant. The interaction between the carrier and the dopant is such that a fluorescent fingerprint of the marker is different from that of the rare earth dopant. The carrier doped with the rare earth ion has a new energy level profile that allows transitions different to those allowed by either the rare earth element or the undoped carrier. The new energy profile is advantageous for security purposes because it provides narrow emissions at wavelengths not naturally found in either the rare earth element or the undoped carrier.

The sensors comprise one or more light sources such as LEDs or similar and a receptor arranged to detect particular spectral profiles of the markers in the case that the markers provide a spectral profile. This type of arrangement is particularly advantageous because it is very unlikely that "noise" will be present, that is, material having the same spectral profile outwith the self-service apparatus. This differs from the situation where other types of markers such as RF tags are used. Also, the sensors themselves are small and inexpensive. In addition they are easy to fix to or incorporate in the housing and/or sub-assembly.

Figure 4:
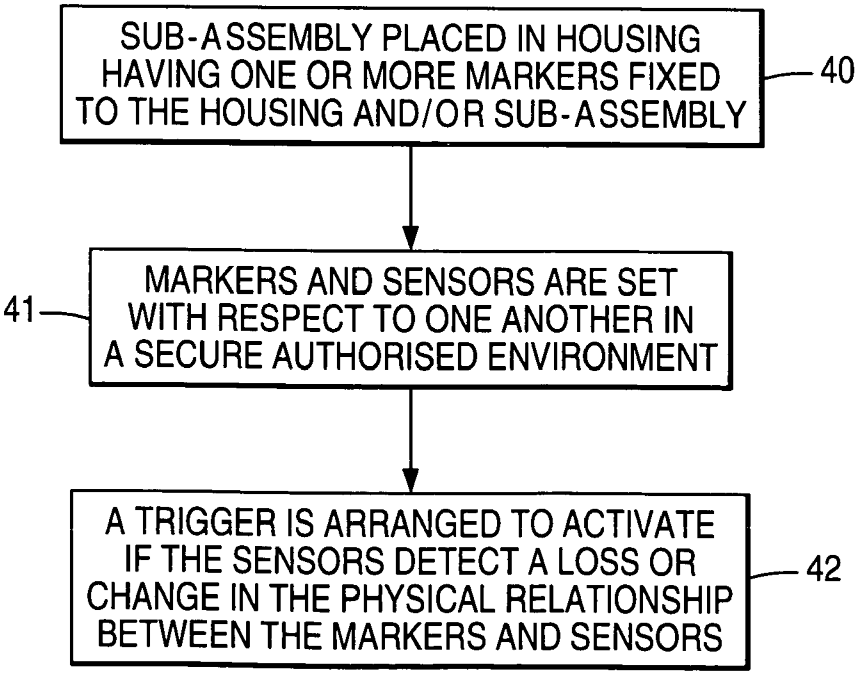
FIG. 4 is a flow diagram of a method of protecting or authenticating a sub-assembly in a self-service apparatus.

FIG. 4 is a flow diagram of a method of protecting or authenticating at least one sub-assembly in a self-service apparatus. The sub-assembly is placed in its housing and one or more markers are fixed to the housing and/or sub-assembly (see box 40 of FIG. 4). In a preferred example, the sub-assembly is placed, fixed to, or encased in the housing. The markers and sensors are then set with respect to one another in a secure, authorized environment (see box 41). For example, this is done at the manufacturing site. During this setting or calibration process the sensors are tailored to 'expect' a particular unique spectral signature or other characteristic signal from the markers. This original spectral signature or other characteristic signal (also referred to as a security profile) is stored in the central control centre 15 or in non-erasable memory within the sub-assembly. The security profile is also dependent in part on the physical relationship between the sensor and the marker(s). A trigger is then arranged to activate if the sensors detect loss or change in the physical relationship between the markers and sensors.

It is also possible for the sensors to be present in the self-service apparatus itself, outwith the sub-assembly. The sensors in this case can be pre-set to detect authorized sub-assemblies for authentication. This is particularly advantageous because it enables replaceable units such as spare parts to be authenticated such that they are only able to operate if they are genuine. For example, consider a sub-assembly enclosed in a housing, the whole housed sub-assembly being a replacement part for a self-service apparatus or other equipment in the field. Markers are attached to or incorporated into the housing as described herein. The self-service apparatus comprises one or more sensors pre-configured to operate with the markers of the sub-assembly housing. When the replacement sub-assembly is inserted into the self-service apparatus, for example, by a field engineer, then the sensors operate with the markers in the housing to authenticate the replacement sub-assembly. In the event that the sub-assembly is not authenticated operation of the self-service device is prevented.

Any range or device value given herein may be extended or altered without losing the effect sought, as will be apparent to the skilled person.

It will be understood that the above description of a preferred embodiment is given by way of example only and that various modifications may be made by those skilled in the art.

What is claimed is:

1. A secure enclosure for protection of at least one sub-assembly in a self-service apparatus, said secure enclosure comprising:
- (i) a housing arranged to contain the sub-assembly;
- (ii) one or more markers fixed in said housing;
- (iii) one or more sensors, each sensor being arranged to detect a particular physical relationship between one or more of the markers and itself;
- (iv) a trigger arranged to automatically activate if any of the particular physical relationships between the sensors and markers is lost; and wherein said markers are fluorescent.

2. A secure enclosure for protection of at least one sub-assembly in a self-service apparatus, said secure enclosure comprising:
- (i) a housing arranged to contain the sub-assembly;
- (ii) one or more markers fixed in said housing;
- (iii) one or more sensors, each sensor being arranged to detect a particular physical relationship between one or more of the markers and itself;
- (iv) a trigger arranged to automatically activate if any of the particular physical relationships between the sensors and markers is lost; and wherein said markers each comprise one or more lanthanides.

3. A secure enclosure for protection of at least one sub-assembly in a self-service apparatus, said secure enclosure comprising:
- (i) a housing arranged to contain the sub-assembly;
- (ii) one or more markers fixed in said housing;
- (iii) one or more sensors, each sensor being arranged to detect a particular physical relationship between one or more of the markers and itself;
- (iv) a trigger arranged to automatically activate if any of the particular physical relationships between the sensors and markers is lost; and wherein said markers each comprise microscopic carrier beads.

4. A secure enclosure for protection of at least one sub-assembly in a self-service apparatus, said secure enclosure comprising:
- (i) a housing arranged to contain the sub-assembly;
- (ii) one or more markers fixed in said housing;
- (iii) one or more sensors, each sensor being arranged to detect a particular physical relationship between one or more of the markers and itself;
- (iv) a trigger arranged to automatically activate if any of the particular physical relationships between the sensors and markers is lost; and wherein said sensors each comprise one or more light sources.

5. A method of protecting or authenticating at least one sub-assembly in a self-service apparatus, said method comprising:
- (i) providing a housing arranged to contain the sub-assembly;
- (ii) providing one or more markers fixed in said housing;
- (iii) providing one or more sensors, each sensor being arranged to detect a particular physical relationship between one or more of the markers and itself;
- (iv) automatically activating a trigger if any of the particular physical relationships between the sensors and markers is lost; and fixing the particular physical relationship between the markers and sensors in a controlled environment prior to use of the sub-assembly in a self-service apparatus in the field.

6. A method of protecting or authenticating at least one sub-assembly in a self-service apparatus, said method comprising:
- (i) providing a housing arranged to contain the sub-assembly;
- (ii) providing one or more markers fixed in said housing;
- (iii) providing one or more sensors, each sensor being arranged to detect a particular physical relationship between one or more of the markers and itself;
- (iv) automatically activating a trigger if any of the particular physical relationships between the sensors and markers is lost; and wherein said step of providing the markers comprises applying paint incorporating the markers to the housing.

* * * * *